US011366453B2

(12) United States Patent
Alun-Jones et al.

(10) Patent No.: US 11,366,453 B2
(45) Date of Patent: Jun. 21, 2022

(54) METHOD AND APPARATUS FOR AUTOMATED MANUFACTURE

(71) Applicant: Unmade Ltd, London (GB)

(72) Inventors: Benjamin Alun-Jones, London (GB); Hal Watts, London (GB); Kirsty Emery, London (GB)

(73) Assignee: Unmade Limited ( * ) Notice: Subject to any disclaimer, the term of this patent is extended or adjusted under 35 U.S.C. 154(b) by 15 days.

(21) Appl. No.: 15/313,176

(22) PCT Filed: May 22, 2015

(86) PCT No.: PCT/EP2015/061375
§ 371 (c)(1),
(2) Date: Nov. 22, 2016

(87) PCT Pub. No.: WO2015/177338
PCT Pub. Date: Nov. 26, 2015

(65) Prior Publication Data
US 2017/0220029 A1 Aug. 3, 2017

(30) Foreign Application Priority Data

May 22, 2014 (GB) .................................. 1409152

(51) Int. Cl.
G05B 19/4097 (2006.01)
G06Q 30/06 (2012.01)
(52) U.S. Cl.
CPC ..... G05B 19/4097 (2013.01); G06Q 30/0601 (2013.01); G06Q 30/0621 (2013.01);
(Continued)

(58) Field of Classification Search
CPC ................ G05B 19/18; G05B 19/4097; G05B 19/40935; G05B 19/40936;
(Continued)

(56) References Cited

U.S. PATENT DOCUMENTS 4,527,402 A * 7/1985 Swallow ................. A61F 13/08
2/239
4,907,164 A * 3/1990 Guyder .................. G05B 19/41
700/173

(Continued)

FOREIGN PATENT DOCUMENTS

EP 1956129 A1 8/2008
JP 2002133201 A 5/2002
(Continued)

OTHER PUBLICATIONS

International Patent Application No. PCT/EP2015/061375 International Search Report and Written Opinion dated Dec. 9, 2015 (16 pages).
(Continued)

Primary Examiner — Jason D Mitchell
(74) Attorney, Agent, or Firm — Conley Rose, P.C.

(57) ABSTRACT

There is disclosed a system architecture for automated modification of computer program code for a manufacturing machine, comprising: an interface for receiving an identification of an item and at least one modification to be made to the item; a memory for storing templates of computer program code, the memory associating each template with an item; and a processor for adjusting at least one template associated with the item by modifying the at least one template with a value associated with the at least one modification.

18 Claims, 10 Drawing Sheets

(52) U.S. Cl.
CPC .............. *G05B 2219/31055* (2013.01); *G05B 2219/32022* (2013.01); *G05B 2219/32035* (2013.01); *G05B 2219/32036* (2013.01); *G05B 2219/45194* (2013.01); *Y02P 90/80* (2015.11)

(58) Field of Classification Search
CPC ........ G05B 19/40937; G05B 19/40938; G06Q 30/0601; G06Q 30/0621; Y02P 90/86
USPC ........................................................... 700/97
See application file for complete search history.

(56) References Cited

U.S. PATENT DOCUMENTS

| | | | | |
|---|---|---|---|---|
| 5,363,308 | A * | 11/1994 | Guyder | G05B 19/4099 318/570 |
| 6,128,546 | A * | 10/2000 | Basista | G05B 19/4205 219/121.67 |
| 7,016,865 | B1 * | 3/2006 | Weber | G06Q 30/00 705/26.5 |
| 7,216,092 | B1 | 5/2007 | Weber et al. | |
| 7,395,225 | B2 | 7/2008 | Fuwa et al. | |
| 7,657,341 | B2 * | 2/2010 | Lind | A41H 3/007 700/131 |
| 8,677,310 | B2 * | 3/2014 | Weatherhead | G06F 8/70 700/131 |
| 8,731,703 | B1 * | 5/2014 | Lehrer | G06F 3/1257 700/132 |
| 9,107,462 | B1 * | 8/2015 | Heinrich | A41H 3/007 |
| 2003/0208556 | A1 * | 11/2003 | Friedman | G06Q 20/105 709/218 |
| 2005/0102151 | A1 | 5/2005 | Fuwa et al. | |
| 2005/0177453 | A1 | 8/2005 | Anton et al. | |
| 2007/0203605 | A1 | 8/2007 | Melton et al. | |
| 2008/0147512 | A1 | 6/2008 | Yankton | |
| 2008/0201002 | A1 * | 8/2008 | Crew | G05B 19/4097 700/98 |
| 2009/0037013 | A1 * | 2/2009 | Hendler | G05B 19/41875 700/103 |
| 2009/0192852 | A1 * | 7/2009 | Solla | G06Q 10/0633 705/7.27 |
| 2013/0184845 | A1 | 7/2013 | Hales | |
| 2014/0059906 | A1 * | 3/2014 | DeLise, Jr. | G09F 3/0289 40/672 |
| 2014/0263633 | A1 * | 9/2014 | Schmucker | G06Q 10/0875 235/385 |
| 2016/0206042 | A1 * | 7/2016 | Cross | G06Q 30/0633 |
| 2017/0076348 | A1 * | 3/2017 | Jennings | G06Q 30/0621 |
| 2017/0273383 | A1 * | 9/2017 | deGuzman | D04B 37/02 |

FOREIGN PATENT DOCUMENTS

| | | |
|---|---|---|
| JP | 2002183552 A | 6/2002 |
| JP | 2002203153 A | 7/2002 |
| JP | 2002230123 A | 8/2002 |
| WO | 2007058123 A1 | 4/2009 |

OTHER PUBLICATIONS

Japanese Office Action dated Jun. 4, 2019, for Japanese Application No. 2017-513349 (5 p.).

* cited by examiner

-- PRIOR ART --

METHOD AND APPARATUS FOR AUTOMATED MANUFACTURE

CROSS-REFERENCE TO RELATED APPLICATIONS

The present application is a National Phase entry of, and claims priority to, PCT Application No. PCT/EP2015/061375, filed May 22, 2015, which claims priority to United Kingdom Patent Application No. 1409152.4 filed May 22, 2014, both of which are incorporated by reference herein in their entireties for all purposes.

STATEMENT REGARDING FEDERALLY SPONSORED RESEARCH OR DEVELOPMENT

Not applicable.

BACKGROUND OF THE INVENTION

Field of the Invention

The present invention is concerned with the modification of templates representing computer program code for manufacturing an item, and particularly for the automated modification of such templates. The invention is particularly but not exclusively concerned with templates providing computer program code for a machine for automated manufacture of a clothing item, such as a knitting machine.

Description of the Related Art

It is known in the art to provide a knitting machine for knitting a clotheswear item. Typically such machines are used to mass produce knitted clotheswear items. A computer program code is written for the manufacture of a particular item, and software based on that code is run on the machine to mass produce the associated item.

When the design of an item is modified, then the computer program code is rewritten in accordance with the modification. If it was desired, for example, to provide for some customisation of knitted clotheswear manufactured using such a machine, then the computer program code is rewritten and then run as part of software on the machine. The need to rewrite the computer program code to achieve any customisation means that customisations using such machines are impractical, because the rewriting of the computer program code is time consuming and costly.

Whilst this is a problem which manifests itself in the use of program controlled machines for producing knitwear, the problem may also arise in other program controlled machines for producing other types of fabric based items, such as woven fabrics, laser cut textiles or materials, or 3D printed parts or combinations thereof. The problem may also arise in computer program controlled machines in general.

A further problem arises in the production of customised items, such as customised knitwear, in the difficulty of tracking individual garments or parts of garments around a factory. This tracking problem exists even without the manufacture of customised items, but is exacerbated by the manufacture of customised items.

It is an aim of the present invention to provide an improvement such that automated machines, such as automated knitting machines, may be used efficiently and cost-effectively to manufacture customised items.

SUMMARY OF THE INVENTION

The invention provides a system architecture for automated modification of computer program code for a manufacturing machine, comprising: an interface for receiving an identification of an item and at least one modification to be made to the item; a memory for storing templates of computer program code, the memory associating each template with an item; and a processor for adjusting at least one template associated with the item by modifying the at least one template with a value associated with the at least one modification.

The system further comprises a memory for storing an identification of a field of a template, the memory for associating each field with a modification, the adjustment comprising modifying an associated field. The system further comprises receiving the template associated with the item, and modifying a field of the retrieved template in dependence on the at least one modification.

The template may be used to generate computer program code for controlling a machine to manufacture the item, wherein the modification of the template modifies a part of the computer program code. The generated computer code may be automatically optimised for a specific manufacturing device at the point at which that device is selected.

The system may further comprise a further interface for transmitting the adjusted at least one template.

The memory may associate a plurality of templates with an item. The further interface may transmit the plurality of templates, including any adjusted template.

The system may comprise a central management server and a manufacturing entity comprising one or more manufacturing machines, wherein the central management server comprises the interface, the memory, and the processor, and the system includes a further interface for transmitting a modified template to a manufacturing entity.

The system may comprise a central management server and a plurality of manufacturing entities each including one or more manufacturing machines, wherein the central management server includes the interface, and further includes a routing block for routing the order to one of the manufacturing entities, and each manufacturing entity included a memory and a processor.

The system may comprise an interface for receiving status information from each manufacturing entity, the routing being in dependence on the received status information.

The may further comprise an address determination block for determining an address of a manufacturing entity in the order, the routing being dependent on the determined address.

The system may further comprise an order status block, for determining a status of an order, and an interface for transmitting a status of an order to a user.

The at least one modification to be made to the item may defined by a user.

The system may comprise a control block for allocating an order code to a received order, and modifying each template associated with the order to generate a waste panel for each item which includes the order code.

The invention also provides a method of automated modification of computer program code for a manufacturing machine, comprising: receiving an identification of an item, and at least one modification to be made to the item; storing templates of computer program code; associating each stored template with an item; and adjusting at least one template associated with the item by modifying a stored template with a value associated with the at least one modification.

The method may further comprise storing an identification of a field of a template, associating each field with a modification, the adjusting step modifying the field of the template.

The method may further comprise receiving the template associated with the item, and modifying a field of the retrieved template in dependence on the at least one modification.

The modifying step may comprise modifying a part of a computer program code for controlling a machine to manufacture the item.

The method may further comprise transmitting the adjusted at least one template.

The method may further comprise associating a plurality of templates with an item. The method may further comprise transmitting the plurality of templates, including any adjusted template.

The method may further comprise transmitting the modified template from a central management server to a manufacturing entity.

The method may further comprise routing the order to one of a plurality of manufacturing entities, and each manufacturer being adapted to modify a template.

The method may further comprise receiving status information from each manufacturing entity, the routing being dependent on the received status information.

The method may further comprise determining an address of a manufacturing entity in the order, the routing being dependent on the determined address.

The method may further comprise determining a status of an order, and transmitting a status of an order to a user.

The method may further comprise defining the at least one modification to be made by a user.

The method may further comprise allocating an order code to a received order, and modifying each template associated with the order to generate a waste panel for each item which includes the order code.

The invention further provides a method of manufacturing a garment, comprising allocating a unique code to an order for the garment, modifying a computer program code for the garment to include an identification of the unique code, and manufacturing the garment with a waste panel in which the unique code is reproduced.

The garment may be manufactured in parts, each part being manufactured with a waste panel identifying said code, and further wherein the computer code for each part is additionally modified to identify the part, the waste panel for each part additionally including an identification of the part.

The invention also provides a system for manufacturing a garment, comprising a control block for allocating a unique code to an order for the garment, and a processor for modifying a computer program code for the garment to include an identification of the unique code, and a manufacturing entity for manufacturing the garment with a waste panel in which the unique code is reproduced.

The manufacturing entity may manufacture the garment in parts, each part being manufactured with a waste panel identifying said code, and further wherein the processor modifies the computer code for each part to identify the part, the waste panel for each part additionally including an identification of the part.

In general the invention provides a technical solution to allow for a customised knitwear item to be made using a knitwear machine without having to manually write the software code for controlling the knitwear machine in accordance with the customisation required.

The invention provides for the provisions and storage of templates of computer program code associated with selectable items. Fields of the computer program code can be modified, in dependence on selection of an item and selection of a modification to the item. The modified computer program can be input to a knitwear machine to manufacture the selected knitwear item according to a specified modification.

The invention thus allows for the speed of operation of a system to be increased to such an extent that it becomes viable to allow customisation of the manufacture of knitwear using an automated knitting machine. The invention further allows garment tracking information to be provided in a way that is hidden from the end customer.

The invention allows the system to operate faster, such that the customisation of knitwear for an automated manufacturing process is commercially viable.

The invention overcomes time and cost issues.

BRIEF DESCRIPTION OF THE FIGURES

The invention is now described by way of example with reference to the accompanying figures, in which.

DESCRIPTION OF PREFERRED EMBODIMENTS

The invention is described by way of example with reference to a particular embodiment. In particular the invention is described by way of example to a customer purchasing an item from a website by Internet access, and then a service provider processing that purchase to manufacture that item. The invention is however not limited to this embodiment.

The invention is specifically described in the context of an embodiment comprising the ordering, manufacturing, and delivering of a customised order for a knitted clotheswear item. The invention is not limited to this embodiment, or specifics described.

Figure 1:
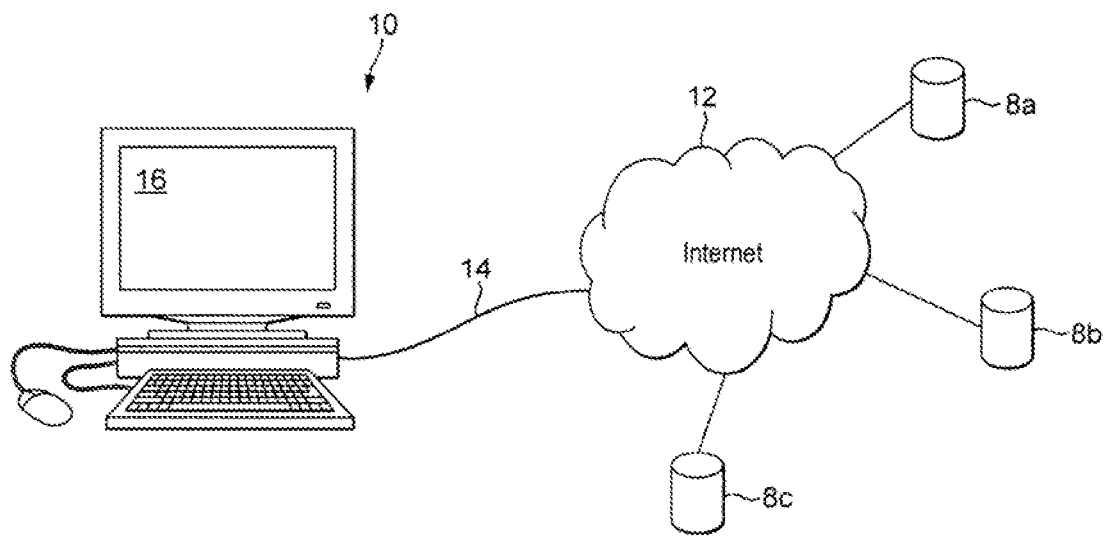
FIG. 1 illustrates an exemplary customer computer connected to the Internet.

With reference to FIG. 1, there is illustrated an exemplary scenario for a customer (or user) to order a clotheswear item. There is illustrated a computer 10 being used by a customer. It will be understood that the inclusion of a computer in this exemplary scenario is illustrative, and a customer may use any one of a variety of devices, including mobile devices. The device may also be, for example, a kiosk provide in a store or retail location. In general, the customer device may be any device equipped for web browsing.

The computer 10 is connected to the Internet 12 wirelessly or by wired connection, generally illustrated by connection 14. The display 16 of the computer 10 displays the content of a website. Various web servers 8a, 8b, 8c are also illustrated, for example, as connected to the Internet.

Figure 2:
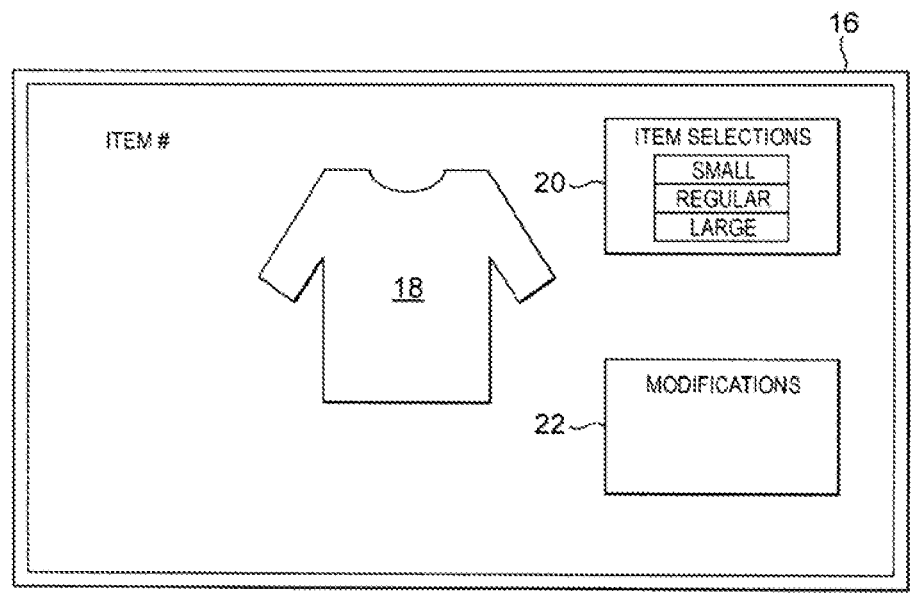
FIG. 2 illustrates an exemplary Website page.

FIG. 2 illustrates an example instantaneous display of the content of a website, such as may be facilitated by one of the web servers 8a, 8b, 8c and displayed on the display 16. FIG. 2 illustrates a clothing item 18, a selection block 20 for selecting item sizes, and a modification block 22 for modifying the item in accordance with the modifications permitted and offered by the website.

In accordance with the described embodiment a website may offer a retail portal for customers to purchase knitted clotheswear items. A customer may be able to browse the website to view and select items. In this way a customer is able to select a particular item displayed on the website, including selecting a specific size of that item. A customer can therefore select an item which is offered for sale.

A selection of a size for an item is a standard selection which must be made for any clothing purchase. The modification block 20 is illustrative of such standard selections which are always made.

In addition, in accordance with the described embodiment, a customer may also optionally select other modifications to the standard item, such as a modification to a colour of a part of an item, for example. The modification block 22 represents such optional selections.

In accordance with the described embodiment a user is able to additionally select optional modifications to be applied to a selected item to customise that item. The optional modifications allowed may be determined by the website provider, but may include a variety of options.

The optional modifications which a user may be allowed include:
  Selection of a particular colour for a particular part of an item.
  Selection of a particular size for a particular part of an item.
  Selection of a particular pattern for a particular part of an item.
  Creation of their own pattern, and application to a particular part of an item. A user may create their own pattern by direct manipulation or by generative manipulation. In direct manipulation, a user may select one or more pixels or stitches, and apply a specific change to those one or more pixels or stitches. This would allow a user, for example, to apply a particular colour to a set of pixels or stitches. With generative manipulation, a user may select multiple pixels or stitches, and select an adaptive algorithm to be applied to those pixels or stitches. This would allow the algorithm to manipulate the selected pixels or stitches. Reference to a pixel or a stitch refers to a single unit of an item which may be modified, with different implementations defining the size of a single unit which may be modified in any given implementation.

These options which a user may be allowed are illustrative and not exhaustive.

Permitted optional modifications can be controlled by the website provider or a service provider.

Thus a user can choose an item and apply a standard selection to it (e.g. a clothing article of a particular size), and then can also optionally select one or more optional modifications to be applied to that article (e.g. a colour to be applied to a particular part of the item).

Figure 3:
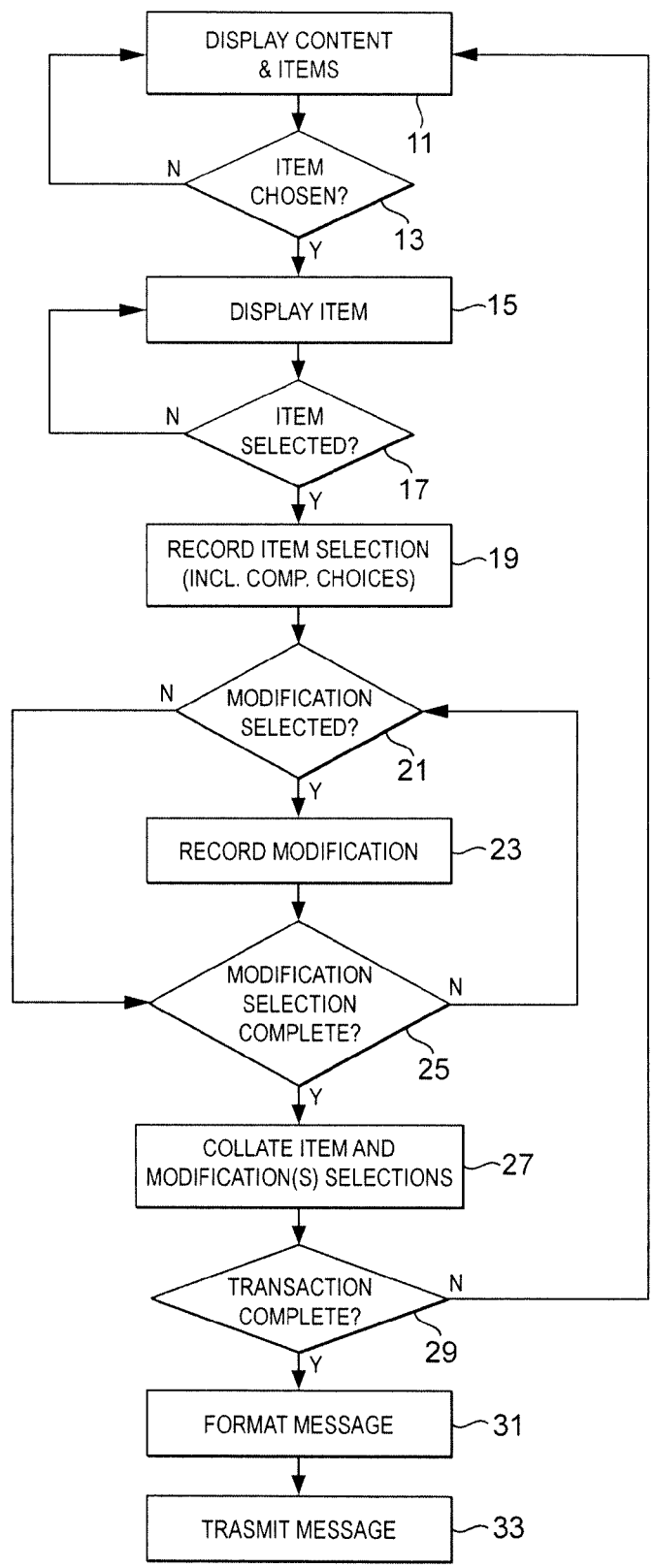
FIG. 3 illustrates an exemplary process for purchasing an item displayed on a Website using a customer computer.

This is further described with reference to the process of FIG. 3.

As denoted by a step 11, the website generally displays content and items to customers browsing the website, for example a customer browsing the website using computer 10 (or in general any device suitably equipped for web browsing).

In a step 13 the choosing of an item is monitored. If no item is chosen the process remains in step 11, and if an item is chosen then the process moves on to step 15, and a particular item is displayed.

After the selected item is displayed, in step 17 it is determined whether the chosen item is selected. If the item is not selected then the process remains in step 15, and if the item is selected then the process proceeds to step 17.

The selection of an item may require selection of certain additional information, without which a selection cannot proceed. Where the item is clotheswear, the additional information may, for example, be size. Thus the selection of the item may inherently require selection of a size. In alternative implementations, however, the selection of such additional information may be carried out in a following distinct step. In accordance with the described embodiment, the selection of an item is understood to include the selection of all necessary options needed to complete selection of the item. This includes any standard selection associated with box 2 of FIG. 32 for example.

If an item is selected in step 17, then in step 19 the selection of the item is recorded. This step of recording the selection preferably also records the selection of any standard choices associated with the selection, such as item size.

Next, in a step 21, it is determined if an optional modification is selected. If an optional modification is selected, then in step 23 the optional modification is recorded. After recordal of the optional modification in step 23, or if no optional modification is selected in step 21, then in step 25 it is determined if optional modification selection is complete. Whether optional modification selection is complete may be determined in a number of ways, for example by selection of all available fields: if there are still optional modification fields available or unused, then selection of optional modifications can continue. Alternatively a customer may indicate that selection of any optional modifications is complete by selecting an appropriate icon displayed on their computer display.

Whilst in the context of this example these modifications are described as optional, in some implementations some or all of these modifications may not be optional.

If optional modification selection is not complete, then the process reruns to step 21. If optional modification selection is complete then in step 27 the item and the selected optional modification(s) are collated.

In step 29 it is then determined if a transaction has been completed. A transaction may be completed by a purchase transaction being completed. Once a customer has selected an item and one or more optional modifications for the item, the customer may complete a purchase transaction using the payment facility provided by the website. The purchase may be associated with other purchases, the other purchases being for other items/modifications or other goods/services. The purchase may also be added to wish lists, shared with friends, or even sold as a design through an online marketplace. This transaction completion is outside the scope of the present invention.

A transaction may not be completed because a customer intends to browse the website further, in which case the process returns to step 11.

The provision of a website offering such retail services, the selection of items, and the purchase of items, will be generally known to one skilled in the art.

If the transaction is complete, then in step 31 a message is formatted based on a collation of the item identity, the standard modifications to the item, and the optional modifications to the item. Then in step 33 the message is transmitted.

The message may be formatted by the computer 10 of the customer, and transmitted from the customer computer 10 to the Internet 12. Alternatively the message may be formatted and transmitted by the system architecture providing the website operation. The protocol for formatting the message, and the transmission of the message, is outside the scope of the present invention.

For the purpose of explanation, it can be understood that once an item is purchased, a message is sent to a system architecture associated with a service provider. The origin of the message itself is not important.

Figure 4:
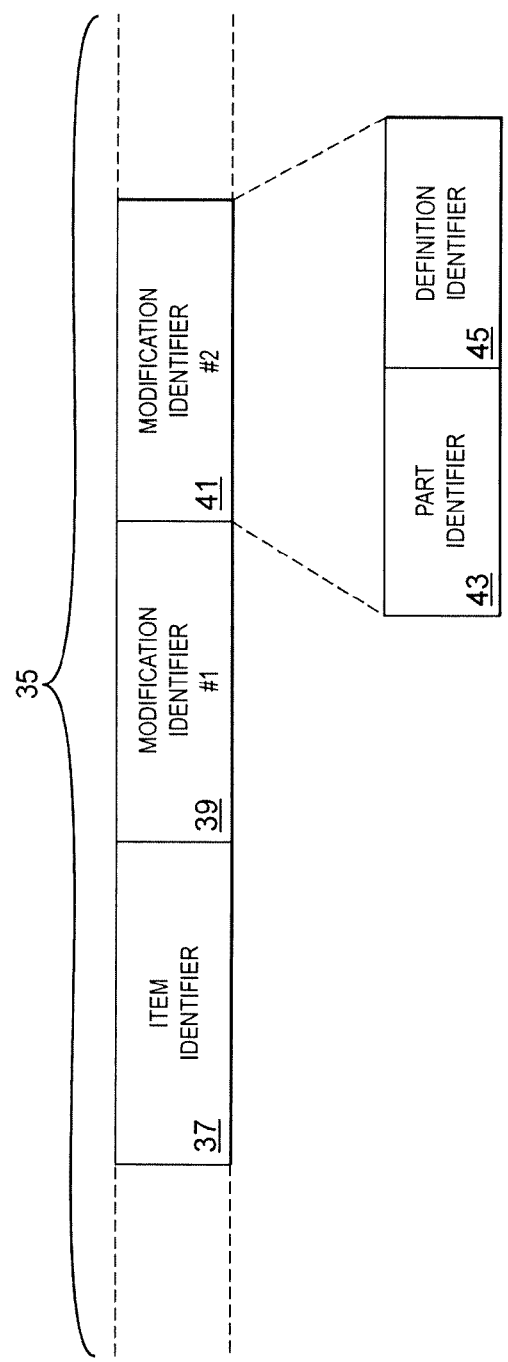
FIG. 4 illustrates a part of an exemplary message format.

The message may comprise an item identifier and one or more modification identifiers. An example message is shown in FIG. 4. The example message 35 comprises an item identifier 37 ("ITEM IDENTIFIER") and two modification identifiers 39, 41 ("MODIFICATION IDENTIFIER #1" and "MODIFICATION IDENTIFIER #2"). As also shown in FIG. 4, each modification identifier, such as modification identifier 41, may comprise a part identifier 43 ("PART IDENTIFIER") and a definition identifier 45 ("DEFINITION IDENTIFIER").

Each modification identifier identifies an optional modification which may be made to the associated item. In general, the part identifier identifies the part to which a modification is to be made. In general, the definition identifier identifies the modification which is to be made to the associated part. The definition identifier may define a pattern, and may include an uploaded pattern or image, or an algorithmically generated pattern.

In general, there is provided one or more modifications to an item.

The message 35 of FIG. 4 may include information other than the item identifier and modification identifiers, such as address information, error checking information, and other payload information.

The definition in the message of the modification which is to be made to the associated part may be implementation dependent. In general the definition must be provided in a format which can be read and understood by the message recipient, as discussed further hereinbelow.

The message may be transmitted via communication means to an interface associated with a service provider. The interface may provide a communication interface to the Internet for the service provider's system architecture. The message may be received under the control of the website providing the retail portal used by the customer associated with computer 10.

The service provider may be an entity having control over the customisation of the order associated with the item in accordance with the described embodiment. The service provider may receive the order, including the identity of the item and the modification to be applied to the item, and modifies a computer program code associated with the item to provide a customised computer program code without manual intervention. The service provider may then deliver an appropriate computer program code to a manufacturing machine.

There may be a plurality of service providers, and ones of the plurality of service providers may bid for a job to create customised products, resulting in appropriate speed of delivery, quality and price for a customer.

It will be understood that in general the service provider provides the functionality to allow a computer program code to be adapted in accordance with a specified modification, and in the following an implementation of the service provider is set out and described which is exemplary only. The implementation of the service provider may vary, and will vary for example in accordance with the message format received defining the modification to be made.

Figure 5:
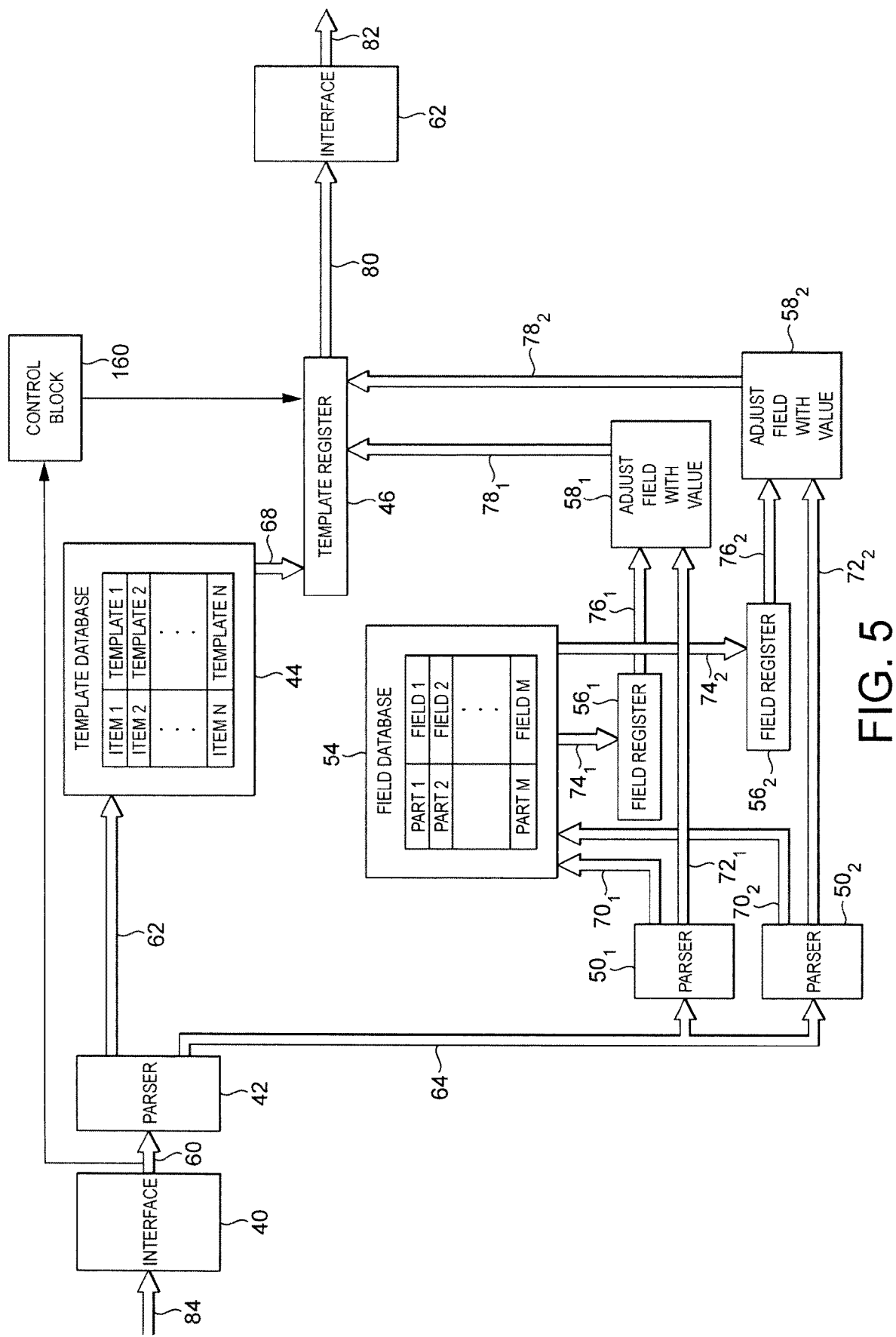
FIG. 5 illustrates an exemplary system architecture of a service provider.

An exemplary service provider system architecture is illustrated in FIG. 5, and may comprise an Internet interface 40, a first message parser 42, a template database 44, a template register 46, a plurality n of modification parsers $50_1$ to $50_n$, a field database 54, a plurality n of field registers $56_1$ to $56_n$, a plurality n of field adjustment units $58_1$ to $58_n$, and a machine interface 62. In the illustrated and described example, n=2.

FIG. 5 additionally includes a control block 160, which generally controls the operation of the elements of FIG. 5. As will be described further hereinbelow, the control block 160 may also be used to allocate a unique identifier to an order, and modify any template associated with the order to include the unique identifier, preferably such that each part of the order which is manufactured has a waste panel which includes the unique identifier.

A message from the Internet is received at the interface 40 on external communication lines 84 and forwarded on internal communication lines 60. The message may generally be received on external communication lines 84 from any message source via any network, and for the purposes of example the message is assumed to be received on communication lines 84 from the Internet. The message source may be a system architecture associated with the website through which the item was ordered, or another appropriate source for securely facilitating the order.

In the illustrated embodiment the system architecture for processing the message is provided separately to any system architecture for generating the message, such as the system architecture associated with the website or the operation of the website, any system architecture associated with the manufacture of the item, and any system architecture associated with the delivery of the item. However in alternative embodiments a single system architecture may provide the functionality of FIG. 5 and any functionality required for the website or purchase of an item from the website, or any other functionality, for example.

Figure 6:
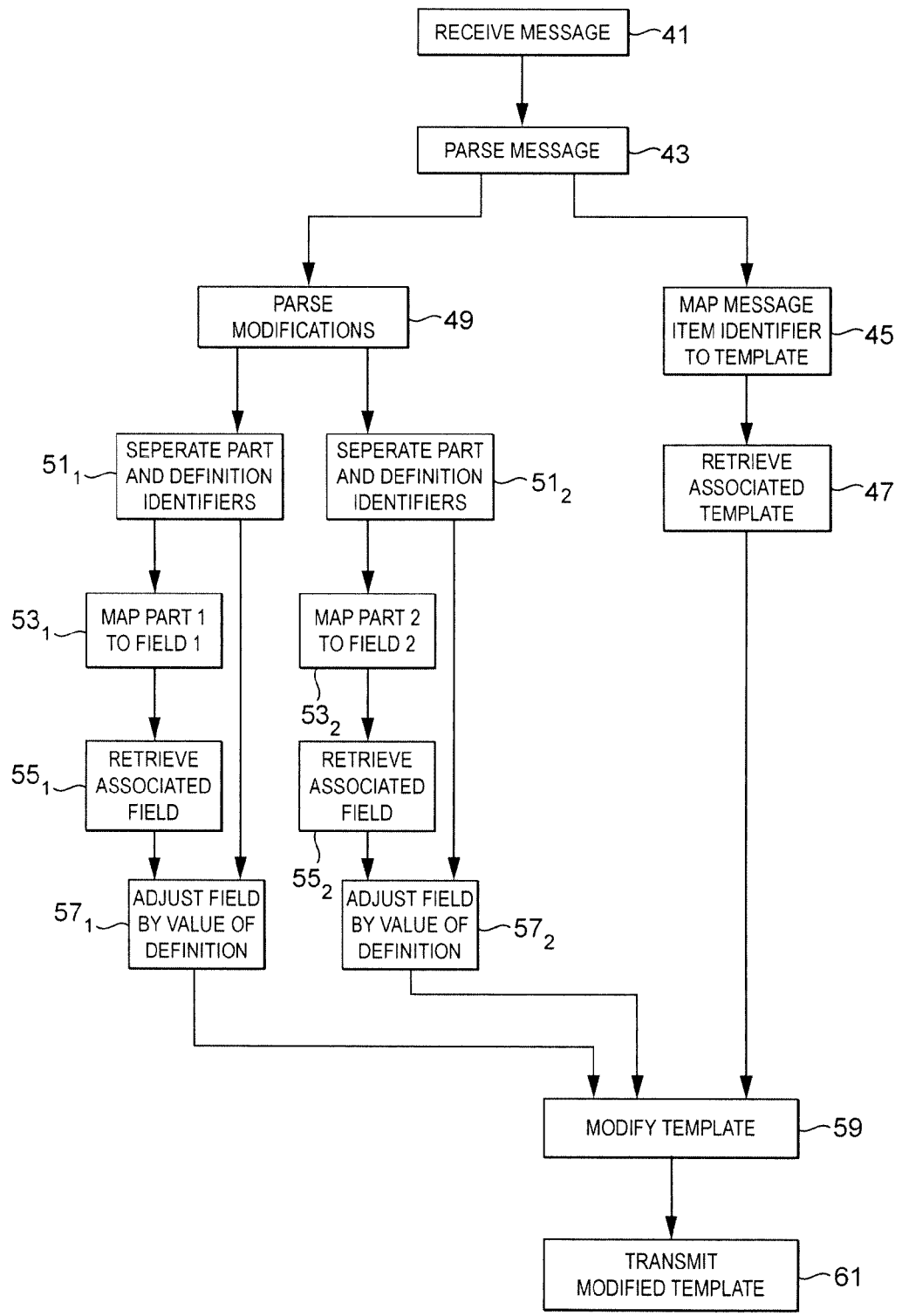
FIG. 6 illustrates an exemplary process for the operation of the system architecture of FIG. 5.

The operation of the exemplary system architecture of FIG. 5 is now described with additional reference to the exemplary process of FIG. 6.

The interface 40 receives the message in step 41 and passes the received message to the message parser 42. The interface 40 may identify a message on communication lines 84 as being a message for processing by the system architecture of FIG. 4 based on identification information included in its header, in accordance with standard messaging protocols.

The message parser 42 parses each message, as denoted by a step 43, into a first part comprising the item and a second part comprising the modification(s) to the item. For this example it is assumed that a message includes two modifications to the item (n=2). The messages parser 42 thus parses the message into a first part on communication lines 62 comprising the item, and a second part on lines 64 comprising the two modifications.

Each item identifier provided on communication lines 62 maps to at least one stored template, each stored template comprising computer program code. In practice, each item identifier may map to more than one stored template, a number of stored templates each defining computer program coder for a part of an item.

The item part of the message on communication lines 62 from the parser 42 is provided as an input to the template database 44, which may be arranged as a look-up-table (LUT). The template database or LUT 44 is arranged to store a plurality of templates, each item being associated with one template. Thus for each item there is an associated template, and the template database stores all the templates together with a mapping between the item identifiers and the templates. When configured as an LUT, on application of the item identifier on communication lines 62, the associated template is output on communication lines 68. The mapping of a message item identifier to a template is denoted in FIG. 6 by step 45.

Thus, responsive to the item identifier of the parsed message on communication lines 62, the associated template is provided on communication lines 68 and stored in the template register 46. The retrieval of the associated template is denoted in FIG. 6 by step 47.

Although it is described, for simplicity, that one stored template is accessed and retrieved, in practice several stored templates may be accessed and retrieved, the several stored templates all being parts of the item.

The modification(s) part of the message on communication lines 64 from the parser 42 is provided as inputs to the modification parsers $50_1$ and $50_2$. The number n of modification parsers corresponds to the number of modifications which are permitted. In the described example, two modification parsers (n=2) $50_1$ and $50_2$ are shown as representative of the example of two modifications being permitted.

The modification parsers $50_1$ and $50_2$ are adapted to parse and transmit the part of the message with which they are associated, being one of the modifications. Each modification may thus be processed separately but in parallel in the described example. The purpose of the modification parsers $50_1$ and $50_2$ is to separate the processing of the modifications into separate flows.

In this example the first modification parser $50_1$ receives the parsed modifications on communication lines 64, and provides the first modification. The second modification parser $50_2$ receives the parsed modifications on communication lines 64, and provides the second modification. The parsing of the modifications is denoted in the process of FIG. 6 by step 49.

The parsed first modification is then provided in two parts: the part identifier is provided on communication lines $70_1$ and the definition identifier is then also provided on communication lines $72_1$. The second parsed modification is provided in two parts: the part identifier is provided on communication lines $70_2$ and the definition identifier is provided on communication lines $72_2$.

The separation of each modification item into a part identifier and a definition identifier is denoted by steps $51_1$ and $51_2$ in FIG. 6.

Each part identifier maps to a specific field stored in the field database 54.

The part of the message on lines $70_1$ from the parser $50_1$ is provided as an input to the field database 54, which may be arranged as a look-up-table (LUT). The field database or LUT 54 is arranged to store a plurality of fields, each part being associated with one field. Thus for each part there is an associated field, and the field database stores all the fields together with a mapping between the parts and the fields. When configured as an LUT, on application of the part identifier on communication lines $70_1$, the associated field is output on communication lines $74_1$. Thus, responsive to the part identifier of the parsed message on communication lines $70_1$, the associated field is provided on communication lines $74_1$ and stored in the field register $56_1$.

Similarly, the part of the message on lines $70_2$ from the parser $50_2$ is provided as an input to the field database 54, which may be arranged as a look-up-table (LUT). When configured as an LUT, on application of the part on communication lines $70_2$, the associated field is output on communication lines $74_2$. Thus, responsive to the part identifier of the parsed message on communication lines $70_2$, the associated field is provided on communication lines $74_2$ and stored in the field register $56_2$.

The mapping of the part identifier of the first modification to a field is denoted in FIG. 6 by step $53_1$, and the mapping of part identifier of the second modification to a field is denoted in FIG. 6 by step $53_2$. The retrieval of the associated field is denoted in FIG. 6 by steps $55_1$ and $55_2$ respectively.

The definition identifier part of the modification on communication lines $72_1$ from the parser $50_1$ is provided as an input to the field adjustment block $58_1$. The field adjustment block $58_1$ also receives the identification of the field on line $76_1$ from the field register $56_k$. The field adjustment block $58_1$ then adjusts the identified field of the template now stored in template register 46 by the value provided on communications lines $72_1$ via communication line $78_1$.

Similarly, the part of the message on lines $72_2$ from the parser $50_2$ is provided as an input to the field adjustment block $58_2$. The field adjustment block $58_2$ also receives the identification of the field on line $76_2$ from the field register $56_2$. The field adjustment block $58_2$ then adjusts the identified field of the template retrieved in template register 46 by the value provided on communications lines $72_2$ via communication line $78_1$.

The control of the adjustment of the specified field by the specified value for each modification is represented by respective steps $57_1$ and $57_2$ in FIG. 6. In step 59 the adjustment controls of steps $57_1$ and $57_2$ are applied to the template retrieved in step 47, to provide a modified template.

The modified selected template in template register 46 is then transferred to the interface 62 on line 80, and the interface 62 provides the modified template on output lines 82 to a machine. The transmission of the modified template is represented in FIG. 6 by step 61.

The foregoing description sets out an example in which the modification defines a field of a retrieved template which is to be modified. In practice the modification of the template (s) for an item may be achieved in other ways. For example a modification may combine elements of multiple templates, and data from one template may be retrieved and copied into another template. Thus the definition identifier may define a part of a particular template to be modified, and may define a part of another template which is to be used for that modification.

The process involves retrieving an existing template and modifying it. Thus an existing template from database 44 is accessed and modified. Preferably, once a modification is made to create a new template which is a modified version of a stored template, that modified template may then itself be stored in the database 44, so that on the next occurrence the modified template can simply be retrieved and used, and the modification exercise does not need to be followed again.

In general the templates stored in the database 44 are pre-compiled computer programs associated with specific items or parts of items, or instructions for generating computer programs that can be compiled for a range of manufacturing devices. When an item or part of an item is modified, a pre-compiled computer program in an existing template is accessed and modified. Such a re-compiled template (being a modification of an existing template) may then be stored in the database for future use as a pre-compiled template.

In summary a received item identifier is mapped to a stored template, the template being the computer program code associated with the item. The stored template is retrieved, and modified according to any modification associated with the item, the modification identifying a field of the template, and a modification to be made to that field, specifically a value of the field. The modified template may then be stored into the database.

The modified template provided on communication lines 82 may be stored on a computer program product. The computer program product may then be used to allow a computer or computer controlled machine to execute the computer program. The computer program product may be a disk drive or other form of storage device for computer program code, either attached to a computer such as a disk drive of a computer or other entity which can be accessed by a computer, such a portable memory device.

Alternatively the modified template provided on communication lines 82, comprising computer program code or instructions for generating computer program code for a generic manufacturing device that can be specified at the last possible moment, may be transmitted directly to a computer or computer controlled machine which can be caused to execute the computer program in accordance with the modified template to manufacture an item. The computer program code on lines 82 is preferably in a form which can be read by a computer controlling a manufacturing machine, or alternatively may be need to be converted on receipt to allow it to be read.

As mentioned above, in practice, one item may be associated with multiple templates. For a clothes item, for example, a template is associated with each part of the item, for example front and back. Thus on receipt of an item, identifier multiple templates in the template database may be identified, an item being mapped to the multiple templates. The multiple templates may then be retrieved, and the modifications applied to the appropriate fields of the multiple templates. The modified templates are then produced, a machine receiving a set of modified templates for manufacturing an item.

Figure 7:
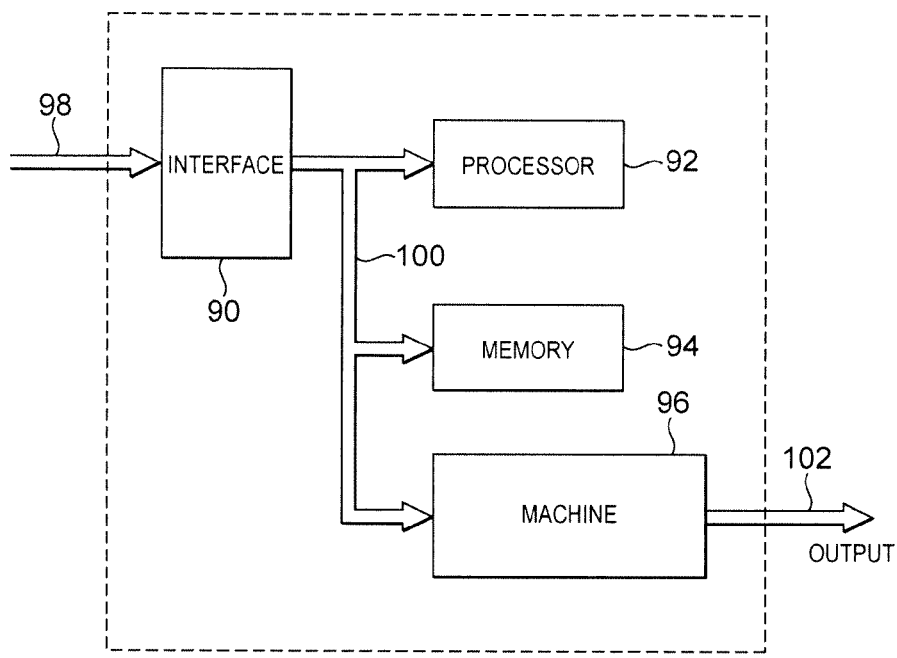
FIG. 7 illustrates a block diagram of an exemplary machine.

With reference to FIG. 7, there is illustrated in general a system architecture for manufacturing a modified item, comprising an interface 90, a processor 92, a memory 94, and a machine 96. The operation of this system architecture is described further with additional reference to FIG. 8.

The system architecture of FIG. 7 including the machine 96 may be provided and implemented separately to the system architecture of the service provider as shown in FIG. 5. The system architecture of the service provider may be provided by a third party to receive items and modifications, and to generated modified templates. The system architecture of FIG. 5 may also be provided as part of the system architecture of FIG. 7.

Figure 8:
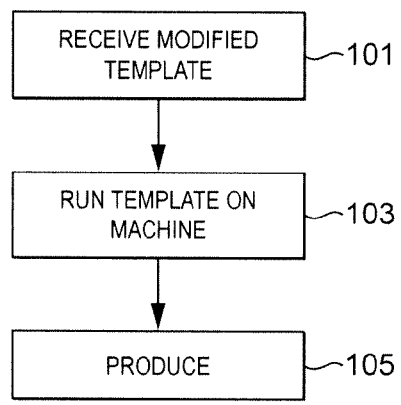
FIG. 8 illustrates an exemplary process for the operation of the block diagram of FIG. 7.

A modified template, such as generated by the system architecture of FIG. 5, is received on communications lines 98 by interface 90, as denoted by step 101 of FIG. 8.

Under the control of the processor 92, utilising the memory 94, the computer program code of the modified template is executed such that the machine 96 operates to manufacture the modified item. The processor 92, memory 94, and machine 96 are interconnected by communication lines 100. The running of the machine 96 in accordance with the modified template is denoted by step 103 in FIG. 8.

The machine 96 thus produces items, as represented by output 102, in accordance with the defined modifications for the items, as also represented by step 105 of FIG. 8.

The machine for manufacturing clothing items may manufacture each part of the clothing item separately, each part corresponding to a template, and (as noted above) several templates being required for manufacturing one item. In the alternative, a whole garment can be made in one go, without needing its parts to be separately manufactured.

The output of the machine is thus a set of parts, which need to be fitted together to form the item, or a single part (whole garment). Once the machine has manufactured the set of parts, the parts may be manually assembled to produce the final item.

The foregoing discussion relates to an exemplary architecture in which the service provider entity is separate from the manufacturing entity, and the modification of templates takes place at the service provider entity before the modified templates are transmitted to a manufacturing system architecture such as illustrated in FIG. 7.

Figure 9:
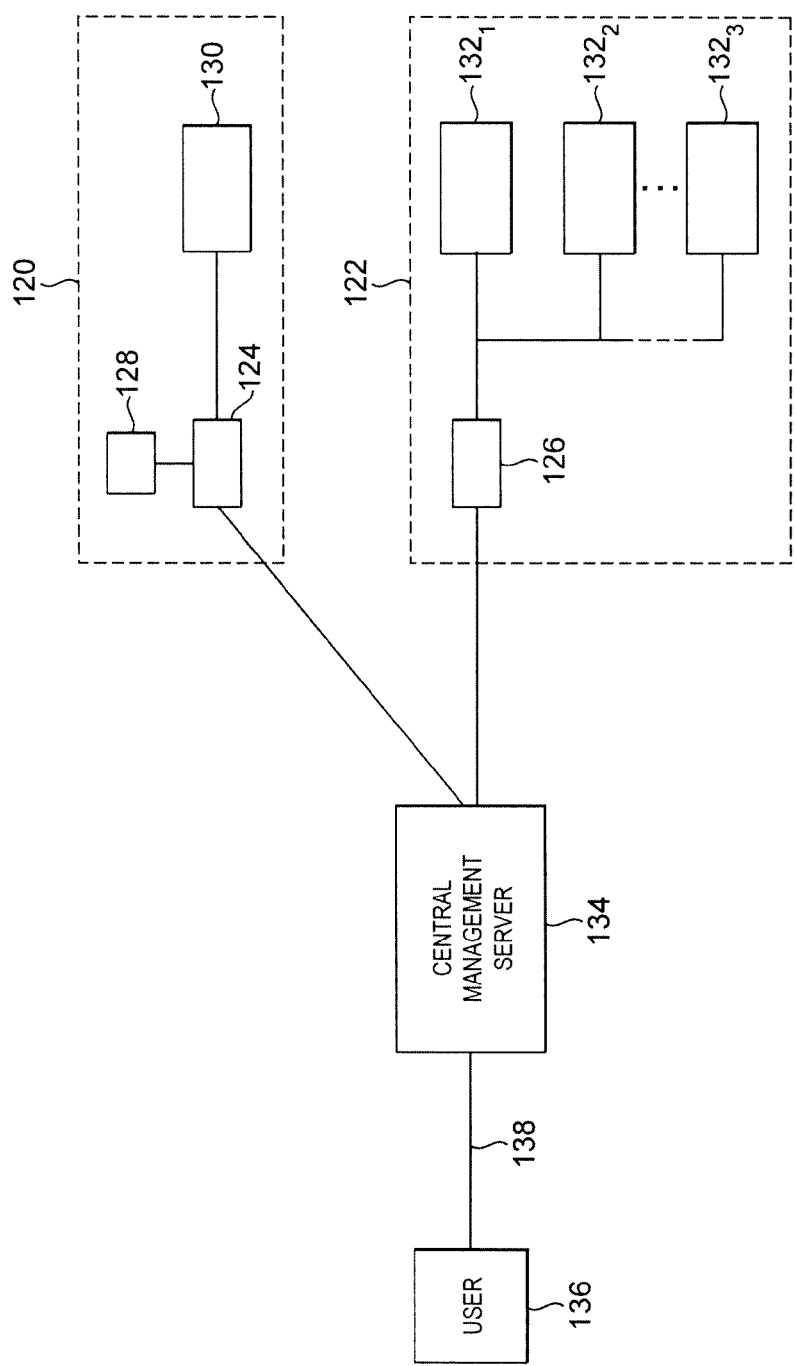
FIG. 9 illustrates an exemplary distributed architecture in which embodiments of the invention may be implemented.

With reference to FIG. 9, there is illustrated an alternative implementation of an architecture in which the same functionality is implemented, but the distribution of the functionality is different.

In the arrangement of FIG. 9, there is illustrated a central management server 134 and two example distributed manufacturing entities 120 and 122, which may be provided at different locations.

Manufacturing entity 120 comprises a knitting machine 130, a control block 124, and a monitor 128 associated with the control block 124. Control block 124 is connected to the knitting machine 130.

Manufacturing entity 122 comprises a plurality n of knitting machines $132_1$ to $132n$, and a control block 126. The control block 126 is connected to each of the knitting machines $132_1$ to $132n$.

Each of the control blocks 124 and 126 is connected to the central management server 134, and the central management server is additionally connected to a user entity 136 by communication lines 138, such a user computer for placing an order. This connection is illustrative, as in practice a user order may be provided to the central management server from a portal associated with a shopping website, or other retailer entity. This arrangement of FIG. 9 is therefore illustrative.

In general the central management server receives a communication such as a message consistent with the message format of FIG. 4, identifying an order of an item and the modification to be made to the item.

The message associated with the order and received by the central management server 134 may identify the order as having been made with a particular retailer or service provider, and the central management server 134 may be adapted to route orders made through a particular retailer or servicer provider to a particular manufacturing entity 120 or 122. Thus the central management server 134 may route a received message to one of the manufacturing entities 120, 122 according to an address identity included therein.

The control block 124 and 126 are provided with the functionality of FIG. 5 above, to process a received message to modify a template. Thus each control block 124, 126 may include a database including an LUT, such as an equivalent to database 44 of FIG. 5. Each control block 124, 126 may also be suitably arranged to modify the stored templates in accordance with the foregoing description, and store the modified templates in the LUT as necessary.

Preferably each control block 124, 126 is provided with a communications interface to communicate with the central management server and its associated knitting machines. The communication interfaces may be Ethernet ports, providing an Internet connection to the central management server 134, and local interconnections on a local factory network.

The central management server may route an incoming message/order to a particular manufacturing entity, in accordance with an address/identifier contained in the message which links the source of the order to a particular manufacturing entity. This may, for example, permit an order which is placed through a particular retailer's website to be manufactured at a manufacturing entity associated with that retailer.

In general, the central management server handles orders which are placed. If an order is not associated with a specific manufacturing entity, or is associated with one of a plurality of manufacturing entities, then the central management server can check or monitor the factories having manufacturing capability, and forward the order to a factory which is able to complete the order. This preferably comprises the central management server 134 receiving information from the control blocks 124, 126 as to the capacity/activity at the local manufacturing elements.

Where a local manufacturing element has multiple knitting machines, such as entity 122, the control block 126 may provide the central management server with status information regarding all of these machines, and the order forwarded to the control block 126 may then include an identification of the specific knitting machine to be used for manufacturing the order, which may allow the code to be generated for that specific machine.

The central management server is able to use the status information provided by the control blocks 124, 126 to provide notifications to users or customers as to the progress of their order.

Figure 10:
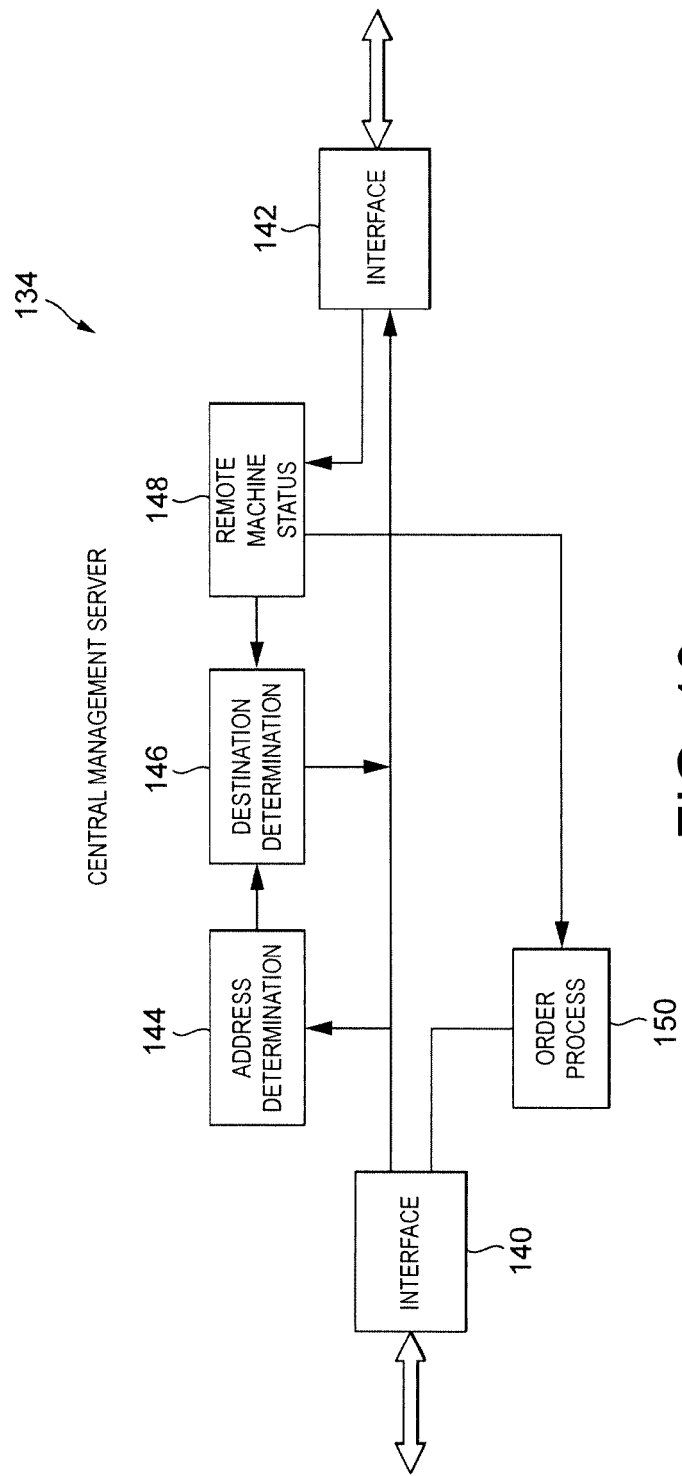
FIG. 10 illustrates an exemplary implementation of a central management server suitable for the architecture of FIG. 9.

With reference to FIG. 10 there is illustrated an exemplary implementation of the central management server 134, which is illustrated as comprising an interface 140, an address determination block 144, a remote machine status block 148, a destination determination block 146, an order progress block 150, and an interface 142.

The interface 140 provides an interface of the central management server to the Internet, and the interface 142 provides an interface of the central management server to the control blocks, such as blocks 124, 126 associated with remote manufacturing entities.

The central management server receives orders on the interface 140, and the address determination block 144 determines whether the order is associated with a particular manufacturing entity or set of manufacturing entities, and provides any retrieved information to the destination determination block 146. The central management server 134 receives feedback from the control blocks of manufacturing entities at the interface 142, which is processed by the remote machine status block 148. This information may include information on the status of orders, and information on the process time of a new order relating to the business of the manufacturing entity. The destination determination block receives information from the address determination block 144 and the remote machine status block 148 and determines the manufacturing entity to send the order to, and preferably the specific knitting machine at the entity to be used, adds that information to the message associated with the order in accordance with the used messaging protocol and then forwards the order with this additional information using interface 142.

The order progress block 150 uses the status information in block 148 to communicate order status to users via interface 140.

Figure 11:
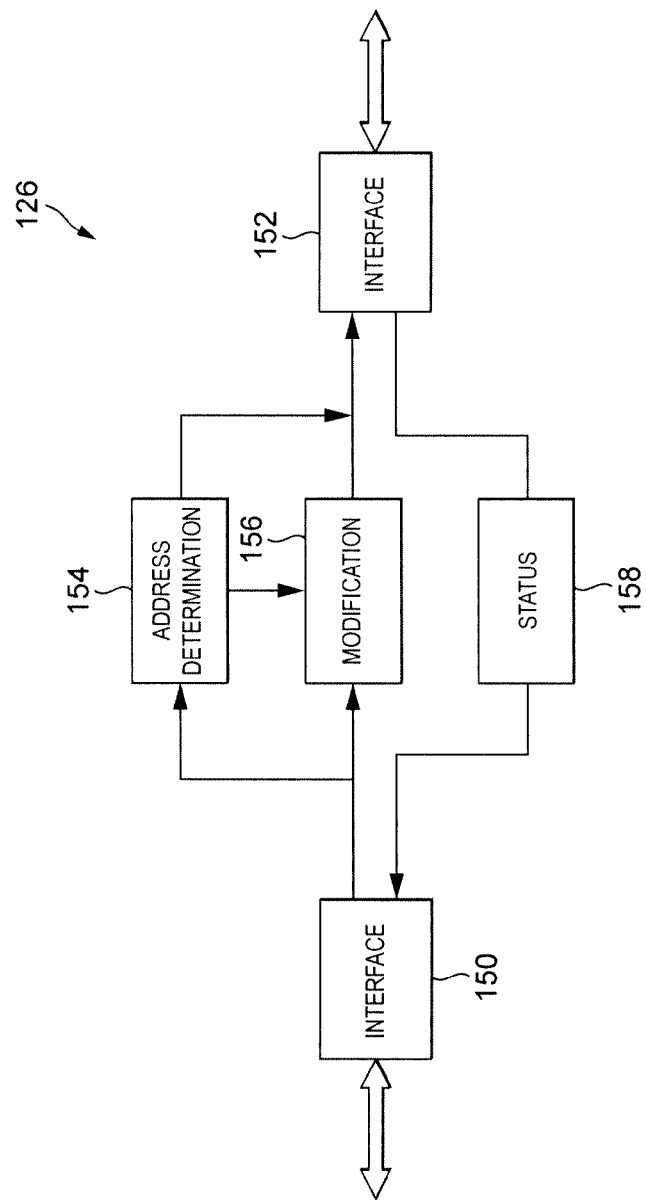
FIG. 11 illustrates an exemplary control block for a manufacturing entity suitable for the architecture of FIG. 9.

FIG. 11 illustrates an exemplary implementation of a control block at a manufacturing entity, such as block 126 of FIG. 9. The control block may include an interface 150, an interface 152, an address determination block 154, a modification block 156, and a status block 158.

The interface 150 is connected to the communication lines to the central management server and interface 142. The received order is provided by the interface to the modification block 156 and the address determination block 154. If the order is for processing by this manufacturing entity, then the address determination block enables the modification block 156, which is adapted to perform the functionality of FIGS. 5 and 6 above.

The address determination block is additionally adapted to add an address to the modified order at the output of the modification block 156, being the address of the specific knitting machine which the central management server has instructed to be used.

The modified order is provided to interface 152, which in turn is connected to the knitting machines. The status block 158 receives inputs from the interface 152 and obtains status information on the knitting machines, which is transmitted to the central management server 134 via interface 150.

Reverting back to FIG. 9, the control block 124 is associated with a monitor 128, and each control block may be associated with such a monitor The monitor may display information such as details of incoming orders, yarns which are to be placed on specific machines to fulfil orders, and can show a completed part so that an operator can check it has been manufactured correctly.

It will be apparent from the foregoing that the required functionality may be distributed as necessary between different elements of an overall system, and the invention does not require discrete elements performing each part of the invention. A distributed arrangement such as FIG. 9, where the functionality of FIG. 5 is distributed to manufacturing entities, and a central management server controls and oversees the distribution of this functionality, may be preferable.

A plurality of service providers such as shown in FIG. 5 may be provided, and each service provider may bid to provide its service for modifying items. In such case some centralised control may supervise and manage the process. In an arrangement such as shown in FIG. 9, each manufacturing entity may bid, and the central management server may decide which manufacturing entity to send an order for an item to be manufactured, based on the bid. The bid may include information such as time of manufacture and cost of manufacture.

As is known in the art, for a machine used to produce knitted items, each knitted part has a waste fabric or waste panel attached to the knitted part by a waste drawthread. This waste panel is normally separated from the wanted part by cutting and pulling the waste drawthread when it is assembled into an item. The waste panel operates to provide a reference point or holding part for assembly with other knitted parts. Once used for this, it is removed. In practice this waste panel is made as small as possible.

In an embodiment, the waste panel is used to provide each part with an identifier, such that all parts making up an item can have the same code. Thus a pattern for the waste panel may be determined based on a code, and then each part of the item identified, and confirmed, by checking for that code on all parts. This code is included in the computer program code for manufacturing the part. As such, each template for an item is modified to include this code, with the code being allocated when the order is received, and each template is modified so that when a part is manufactured the unique code for the item is knitted on the waste panel. This may require increasing the size of the waste panel to accommodate the code. The code may also identify the part, for example as 'left sleeve'.

Referring again to FIG. 5, on receipt of a message identifying an item ordered and the modifications associated with those items, a control block 160 allocates a unique code to the order, which may be the next consecutive code number available. The unique code is then applied to the modified template in template register 46 by the control block 160, and may be applied to any other templates associated with the order which are not modified. The modification of a template in accordance with this code includes modification to make the waste panel with this code included in it. As such, each manufactured part will include a waster panel with the unique code for the order.

Where the modification is to additionally include an identity of the part—e.g. right sleeve—then the modification is appropriate adapted on application to the associated template.

Figure 12:
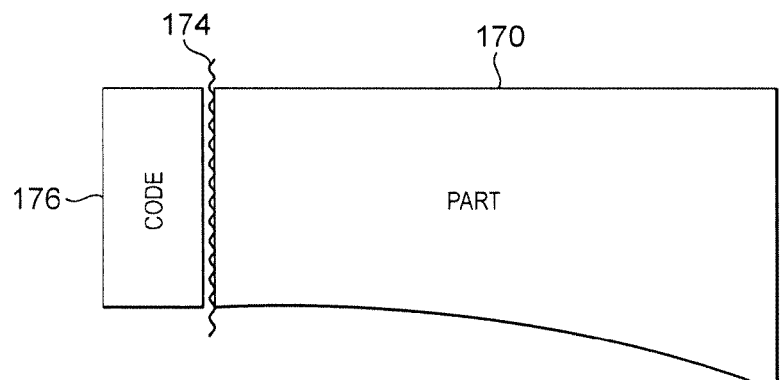
FIG. 12 illustrates a manufactured item including an exemplary modified waste panel.

With reference to FIG. 12, there is illustrated a part 170 and an associated waste panel 176, and a waste drawthread 174. On manufacture the code is added to the waste panel. Removal of the drawthread 174 removes the waste panel from the item 170.

The waste panel can still be removed by pulling the waste draw thread, as the item is assembled, but the use of the code allows the parts of items to be correctly grouped and assembled.

The use of the waste panel in this way saves effort and time, and eliminates mistakes being made, and thus minimises production costs.

A template modified in accordance with the described embodiments could be saved for future use, for example by adding such modified template to the template database 44 of FIG. 5 with an associated unique item identifier, as described above. The unique item identifier which is created for inclusion on the waste panel may additionally or alternatively be provided to the user/customer who made the modification(s), or a third party.

A modified item, customised in accordance with a user preference, may be saved for future use as noted above. The saved modification may then be offered for sale under the control of the user. For example, a marketplace may be provided to allow such modified garments to be offered for sale. The marketplace may be unique to such modified garments, or may provide a sales portal generally for other items. When an item is selected and purchased from the marketplace, it may be manufactured in accordance with the above described techniques.

When a customer orders an item and selects modifications, the website of the system architecture associated with FIG. 4 may allocate a number to the item and modifications. This number may be provided to the customer, either electronically for example when the order is placed, or with the completed order. A customer may be able to enter that number into the website in future to automatically adopt the item and modifications, or to apply the modifications to another item.

A customer may have an account associated with the website or the service provider, and a log may be kept of the item and its modification by the website or the service provider.

The customer may be provided with updates electronically during the process, such as a notification when the order is received, a notification when the manufacture starts/finished, and a notification when the item is dispatched. The notification may also be a notification in advance of the manufacture of where the manufacture will take place, so that a customer may go to the location to watch the manufacture (where the machine carrying out the manufacture is in a location which so permits).

The final item may be delivered to a customer in accordance with the delivery service provide by the retailer associated with the Website.

Whilst the invention is implemented on a computer controlled machine in a computer controlled environment, the invention has a technical effect on a process which is carried on outside a computer controlled machine, such as the manufacture of a garment.

The technical effect of the invention is produced irrespective of the data being processed. The effect is achieved for different items regardless of the data being associated with different items. The technical effect may be achieved for generated knitted items, using knitting machines, but the invention may also be applied to machines for manufacturing non-knitted items.

The technical effect of the invention causes a computer controlled manufacturing system to operate in a new way, as it allows modified/customised items to be made in an automated manner which was not previously possible.

The technical effect provides an increase in the speed of the computer, as previously each item would require manual rewriting of computer program code for a customised item. The reliability of the system is increased, not least by the use of unique codes for orders, and the generation of those unique codes on the waster panels of manufactured parts.

The technical effect provides a solution to the prior art problems.

Modifications and variations can be made to the embodiments illustrated without departing from the scope of the invention as defined by the appended claims.

The invention claimed is:

1. A method of automated modification of computer program code for a knitting machine, the program code being for controlling the knitting machine to knit an article of clothing, comprising:
   responsive to receiving a message parsing the received message into a first part comprising an identification of an item to be knitted, and, a second part comprising at least one modification to be made to the item to be knitted;
   storing templates of the computer program code;
   associating each stored template with an item to be knitted; and
   providing an output of the template comprising the item in dependence on the first part;
   providing an output of the value associated with the modification in dependence on the second part;

adjusting the template associated with the item by modifying the template to create an output template for provision to the knitting machine with a value associated with the at least one modification;

allocating an order code to a received order; and modifying each template associated with the order to generate a removable waste panel for each item that includes the order code;

wherein the template is or is used to generate the computer program code for controlling a machine to manufacture the item, wherein the modification of the template modifies a part of the computer program code; and wherein the computer code is automatically optimized for a specific manufacturing device at the point at which the device is selected.

2. The method of claim 1 further comprising storing an identification of a field of a template, associating each field with a modification, the adjusting step modifying the field of the template.

3. The method of claim 2 further comprising receiving the template associated with the item, and modifying a field of the retrieved template in dependence on the at least one modification.

4. The method of claim 1 wherein the modifying step comprises modifying a part of the computer program code for controlling a machine to manufacture the item.

5. The method of claim 1 further comprising transmitting the adjusted at least one template.

6. The method of claim 5 further comprising transmitting the plurality of templates, including any adjusted template.

7. The method of claim 1 further comprising associating a plurality of templates with an item.

8. The method of claim 1 further comprising transmitting the modified template from a central management server to a manufacturing entity.

9. The method of claim 1 further comprising routing the order to one of a plurality of manufacturing entities, and each manufacturer being adapted to modify a template.

10. The method of claim 9 further comprising receiving status information from each manufacturing entity, the routing being dependent on the received status information.

11. The method of claim 9 further comprising determining an address of a manufacturing entity in the order, the routing being dependent on the determined address.

12. The method of claim 1 further comprising determining a status of an order, and transmitting the status of an order to a user.

13. The method of claim 1 further comprising defining the at least one modification to be made by a user.

14. The method of claim 1, further comprising increasing a size of the waste panel to accommodate the order code.

15. A system for automated modification of computer program code for a knitting machine, the program code being for controlling the knitting machine to knit an article of clothing, the system comprising:

an interface arranged to receive a message;

a parser arranged to parse the received message into a first part comprising an identification of an item to be knitted, and a second part comprising at least one modification to be made to the item to be knitted;

a memory arranged to:
store templates of the computer program code;
associate each stored template with an item to be knitted;
provide an output of the template comprising the item in dependence on the first part; and
provide an output of a value associated with the modification in dependence on the second part; and a processor coupled to the memory, the processor arranged to:
adjust the template associated with the item by modifying the template to create an output template for provision to the knitting machine with a value associated with the at least one modification;
allocate an order code to a received order; and
modify each template associated with the order to generate a removable waste panel for each item that includes the order code;

wherein the template is or is used to generate the computer program code for controlling a machine to manufacture the item, wherein the modification of the template modifies a part of the computer program code; and wherein the computer code is automatically optimized of a specific manufacturing device at the point at which that device is selected.

16. The system of claim 15, wherein the memory is arranged to store an identification of a field of the template, and associate each field with a modification, the processor being arranged when adjusting the template, to modify the field of the template.

17. The system of claim 15, comprising a further interface for transmitting the adjusted at least one template.

18. The system of claim 15, comprising a central management server and a manufacturing entity comprising one or more manufacturing machines, wherein the central management server comprises the interface, the memory, and the processor, and the system includes a further interface for transmitting the modified template to a manufacturing entity.

* * * * *